(No Model.)

L. S. KUHN.
PROCESS OF PREPARING MAIZE FOR MASHING.

No. 313,431. Patented Mar. 3, 1885.

Witnesses.
Robert Everett,
J. A. Rutherford

Inventor:
Leo S. Kuhn.
By Wood & Boyd
Attys.

UNITED STATES PATENT OFFICE.

LEO S. KUHN, OF CINCINNATI, OHIO, ASSIGNOR OF ONE-HALF TO HOFFMAN & AHLERS, OF SAME PLACE.

PROCESS OF PREPARING MAIZE FOR MASHING.

SPECIFICATION forming part of Letters Patent No. 313,431, dated March 3, 1885.

Application filed July 12, 1884. (No model.)

*To all whom it may concern:*

Be it known that I, LEO S. KUHN, a resident of Cincinnati, in the county of Hamilton and State of Ohio, have invented certain new and useful Improvements in Process of Preparing Maize for Mashing, of which the following is a specification.

My invention relates to a process of preparing maize or Indian corn for mashing; and it has particular reference to that class of processes in which the entire kernels are reduced by steaming.

Many attempts have hitherto been made to cook and reduce ordinary corn of commerce by the direct action of steam-pressure in connection with stirrers for agitating the mass. So, also, other mechanical means have been employed to assist in disintegrating the corn while in the cooking-vessel, subject at all times to the action of high-pressure steam; but none of these processes give entire satisfaction.

I have invented a process for cooking ordinary hard corn of commerce for mashes without grinding by a process which consists of two steps. The first step consists in parboiling the whole grain in an open cooking-vessel at a low degree of heat, preferably about 200° of heat, but above the acidifying temperature, which is about 132° or below; second, after the grain has been thoroughly parboiled and taken up all the water which it will absorb, but not enough to crack or burn the kernels. The second step finishes the cooking process in a closed vessel under steam-pressure, which is suddenly increased to 283° Fahrenheit, or fifty pounds pressure, and the steam introduced so as to whirl or rapidly agitate the mass. The sudden raising of the temperature from the low to the higher degree of heat rapidly expands the water within the grain absorbed by the first step and bursts the cellular tissues and thoroughly dissolves the starchy portion of the grain, which is kept in violent agitation until the cooking is completed, when it is blown off and a second charge is cooked as before. In order to thoroughly dissolve the entire mass, I prefer to introduce the steam through tangential jets arranged around the cooking-vessel, so as to give the whole mass a whirling motion.

The cooking apparatus is not claimed herein, but will be made the subject-matter of another application.

In order to explain my process, I have illustrated an apparatus which will accomplish the work, though various forms of apparatus can be employed for the same purpose.

Figure 1:
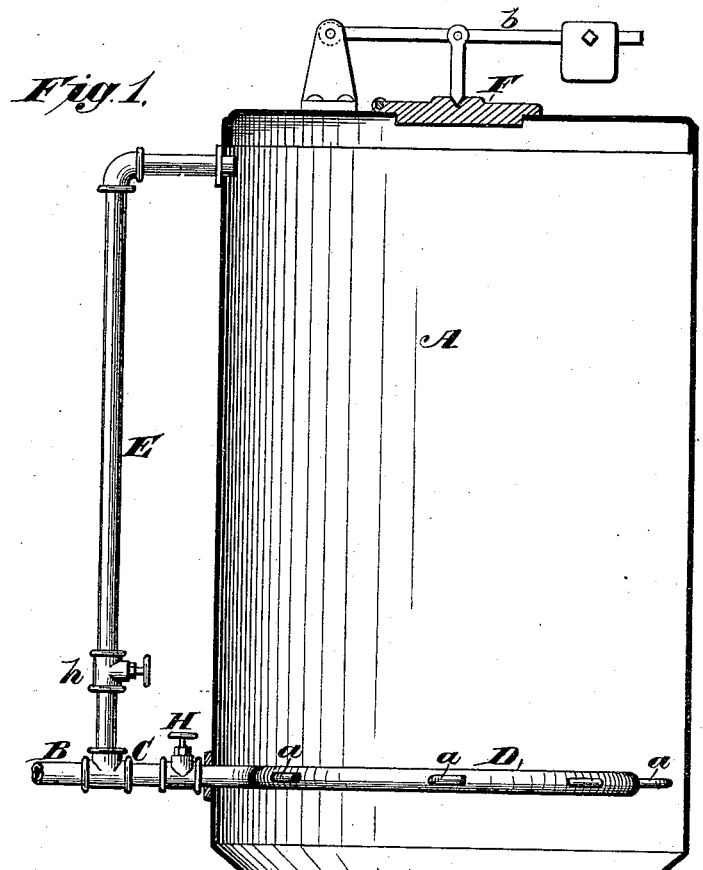
Figure 2:
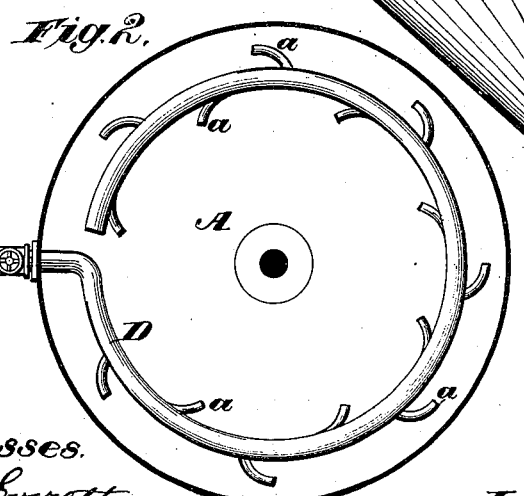

Figure 1 of the drawings is a vertical sectional elevation of the cooking-vessel. Fig. 2 is a cross-section on line $x\ x$, Fig. 1.

A represents a cylindrical boiler, which should be built to withstand safely sixty pounds pressure to the square inch.

B represents a steam-pipe; C, a branch pipe leading to coil D; E, a branch pipe leading to the upper end of the boiler to assist in blowing off the charge.

$a$ represents steam pipes or nipples, the orifices of which terminate spirally or at an angle to the horizontal plane of the cooking-vessel, so as to introduce the steam with a whirling motion.

F represents a man-hole, through which the grain is introduced. It may be held down against the steam-pressure by any ordinary means, such as weighted scale-levers.

G represents a blow-off valve, which valve is opened to allow a cooked charge to be blown off by steam-pressure.

The following is the preferred form of cooking a mash from whole corn: A sufficient amount of water is introduced into vessel A to keep the corn floating, or more than it will absorb. Steam is introduced to heat the water and put it into a whirling motion. A stream of grain is admitted through the man-hole, and it must be kept in motion by the steam, or else the charge will settle to the bottom and the steam cut passages through the mass of grain, some of which will stick to the sides of the vessel and will be scorched in the second step. The corn is parboiled until it has absorbed all the water it can hold, which completes the first step. It is important to carry on this step at a low boiling-heat, or at a heat above 130° Fahrenheit. If the corn is cooked in cold water, it will take too long, besides, if below 130° to 140° Fahrenheit, the starch will sour or the grain commence to lose some of its saccharine properties, which must be retained to give the right flavor to the beer and to prevent waste or loss of spirit yield. The second step consists in finishing the cooking by closing the vessel containing the parboiled charge and suddenly and rapidly raising the heat by increasing the steam till the temperature is raised to about 280° Fahrenheit, so as to burst open the grain by the rapid expansion of the water absorbed in the first step, which action, in connection with the whirling of the mass under the action of the steam, will thoroughly dissolve the grain and render it in fine condition for the mashing. By this process but little water is required in cooking a charge, and it can be quickly cooled by simply adding a sufficient amount of water to reduce the charge to the proper temperature and consistency for mashing. Again, the charges can be cooked quicker than by other processes, and mashes can be prepared at a much less cost for mashing, together with a saving of labor; and, lastly, an increase of yield is obtained over other processes hitherto employed for preparing corn for mashes. These results are obtained by cooking in a small amount of water at two different temperatures and suddenly raising the charge from the lower to the higher degree without loss of heat, and the keeping of the mass in a whirling motion during the last stage of cooking is essential to prevent scorching of parts of the charge.

If two cooking-vessels be employed, the first to parboil the grain, which is then introduced in a whirling motion to a second, and then closing such vessel and suddenly raising the temperature under high pressure of steam, so admitted as to continue the whirling motion in the second cooker, the whirling motion could be dispensed with in the first step of the process.

What I claim is—

1. In the process of preparing corn for saccharification, the art of parboiling the grain by gradually introducing it into a whirling body of water heated in an open vessel by steam, which keeps the charge in a whirl, and continuing the heat at or somewhat below the boiling-point until the kernels have absorbed the maximum amount of water without bursting them, substantially as described.

2. The process of preparing grain for saccharification, consisting in first parboiling the grain in a body of heated water kept in a whirling motion and at a temperature not above the boiling-point, then in subjecting the grain to the action of high-pressure steam in a closed vessel in quantity sufficient to suddenly raise the temperature and expand the water in the grain absorbed in parboiling to disintegrate the kernels, and continuing the cooking and a whirling motion of the charge under the high pressure of the steam until it is cooked and dissolved, substantially as described.

3. The process of cooking maize consisting in placing the same in a small body of water in an open vessel, admitting steam therein, inducing a whirling motion of the water and maize, parboiling the latter, then further treating the charge in a closed vessel with steam under a high pressure admitted in jets which will effect a whirling of the mass, whereby the grain is disintegrated by the rapid expansion of the water of absorption assisted by the attrition of the whirling mass, substantially as described.

4. The process of preparing grain for saccharification consisting in first parboiling the grain in a small body of water kept in a whirling motion by jets of low-pressure steam, then completing the cooking process by subjecting the parboiled grain, without the further addition of water, to the action of high-pressure steam in a closed vessel in sufficient quantity to continue the whirling motion, and to suddenly raise the temperature and pressure to disintegrate and finish the cooking below the scorching-point, then discharging the mass into the mash-tub and adding cold water to cool the charge down to the mashing temperature, substantially as described.

In testimony whereof I have hereunto set my hand.

LEO S. KUHN.

Witnesses:
ANDREW E. SCOTT,
JOHN S. ROEBUCK, Jr.